US010499769B2

(12) United States Patent
Elsendoorn et al.

(10) Patent No.: US 10,499,769 B2
(45) Date of Patent: Dec. 10, 2019

(54) FRYER

(71) Applicant: TNA Australia Pty Limited, Lidcombe (AU)

(72) Inventors: Peter Elsendoorn, De Meern (NL); Dennis Jeandor, Woerden (NL); Ton van Tol, Nieuwkoop (NL)

(73) Assignee: TNA Australia Pty Limited, Lidcombe New South Wales (AU)

( * ) Notice: Subject to any disclaimer, the term of this patent is extended or adjusted under 35 U.S.C. 154(b) by 540 days.

(21) Appl. No.: 15/204,914

(22) Filed: Jul. 7, 2016

(65) Prior Publication Data

US 2017/0127882 A1 May 11, 2017

(30) Foreign Application Priority Data

Jul. 9, 2015 (AU) .................................. 2015902715

(51) Int. Cl.
*A47J 37/12* (2006.01)

(52) U.S. Cl.
CPC ....... *A47J 37/1266* (2013.01); *A47J 37/1214* (2013.01); *A47J 37/1233* (2013.01); *A47J 37/1276* (2013.01)

(58) Field of Classification Search
CPC ................ A47J 37/1214; A47J 37/1233; A47J 37/1266; A47J 37/1276
USPC ....... 426/438, 441, 465, 466, 523, 637, 808; 99/330, 336, 403–407, 409
See application file for complete search history.

(56) References Cited

U.S. PATENT DOCUMENTS

| 4,392,420 | A | | 7/1983 | Caridis et al. |
| 4,867,049 | A | | 9/1989 | Johnson |
| 5,085,137 | A | * | 2/1992 | Mottur ................ A47J 37/1214 99/330 |
| 5,322,006 | A | | 6/1994 | Morioka et al. |
| 2014/0345477 | A1 | * | 11/2014 | Caridis ............... A47J 37/1214 99/348 |

FOREIGN PATENT DOCUMENTS

| CN | 102086939 A | 8/2011 |
| GB | 1 255 454 A | 12/1971 |
| GB | 2 223 155 A | 4/1990 |
| GB | 2461977 A | 1/2010 |
| WO | 2007/086724 A1 | 8/2007 |
| WO | 2012/170523 A1 | 12/2012 |
| WO | 2013/093886 A1 | 6/2013 |
| WO | 2016/094323 A1 | 6/2016 |

OTHER PUBLICATIONS

English Language Translation of CN 102086939.*
Search Report from corresponding British Patent Application GB1611848.1, dated Dec. 14, 2016 (three pages).
Search Report from corresponding Spanish Application No. 201630927 dated Feb. 14, 2017 (four pages).

* cited by examiner

*Primary Examiner* — Dana Ross
*Assistant Examiner* — Joseph W Iskra
(74) *Attorney, Agent, or Firm* — Kilpatrick Townsend & Stockton LLP

(57) ABSTRACT

A continuous fryer that includes a vessel (kettle) (11) through which oil (13) flows in a predetermined direction (12). An upstream end of the kettle (11) is a flow control device (34) that at least aids in maintaining linear flow through the vessel (11) is said predetermined direction (12).

11 Claims, 3 Drawing Sheets

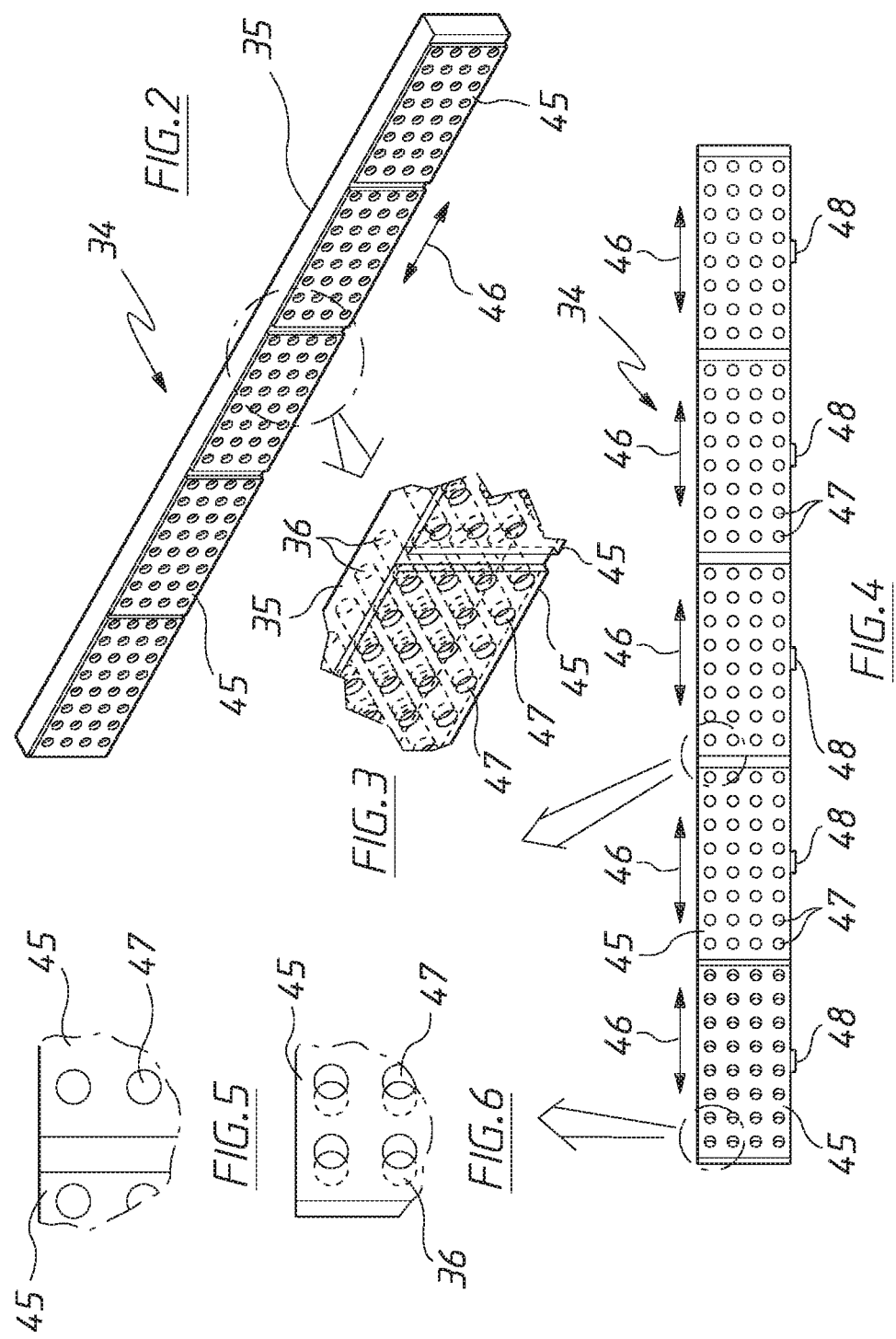

FRYER

CROSS-REFERENCE TO RELATED APPLICATIONS

This application claims the benefit of priority to Australian Application No. 2015902715, filed Jul. 9, 2015, the disclosure of which is incorporated by reference herein.

FIELD

The present invention relates to continuous fryers, and more particularly but not exclusively to single-flow and multi-flow continuous atmospheric fryers and vacuum fryers.

BACKGROUND

Typically atmospheric fryers and vacuum fryers have a number of zones through which product passes to be fried. The fryers including a frying kettle that receives the heated oil, with the kettle having an inlet end and a drained end between which the oil flows, with the oil passing from the outlet end to the inlet end through pumps, filters and heaters.

A conveyor delivers product to the upstream end of the kettle so that the product flows with the oil in a downstream direction. Along the length of the kettle there is usually provided paddles that enter the oil stream and move with the oil stream to aid in moving the product in a downstream direction.

A vacuum fryer is described in International Patent Application PCT/NL2006/000051 (International Patent Publication WO 2007/086724).

Previous continuous fryers have suffered from a number of disadvantages including inconsistently frying the product as a result of high dwell time deviations. This can lead to quality reduction and quality consistency in respect of the product. For example, the natural taste of the product, such as potato, may be degraded, the product may be distorted in shape, while some of the product may have a raised acrylamide content. Other disadvantages are: fatty chips (over fried), increased amounts of small product parts in the fryer that lead to oil quality problems, and longer cleaning times.

OBJECT OF INVENTION

It is the object of the present invention to overcome or substantially ameliorate the above disadvantage.

SUMMARY OF INVENTION

There is disclosed herein a continuous fryer including:
a vessel having a cavity to receive a heated cooking oil;
a pump to circulate the oil so that the oil flows through the cavity in a predetermined direction from an upstream end to a downstream end of the cavity so that product to be fried delivered to the cavity moves in said predetermined direction; and
a flow control device, through which the oil flows to be delivered to said upstream end, to reduce turbulence in the oil in the vessel.

Preferably, the upstream end is provided with a flume.
Preferably, the fryer includes a product moving device including a plurality of spaced plates that engages the oil, with the plates moved in said direction to aid in moving the product in said direction.

Preferably, the plates include a first set of plates, with the plates of the first set being located at spaced intervals along the vessel in said direction, and a second set of plates upstream relative to the oil flow from the first set of plates, and a drive assembly operable to drive the second set of plates at a different speed to the first set of plates.

Preferably, the plates are part of a paddle system including a plurality of shafts from which there extends a plurality of paddles, with the paddles being driven at an angular velocity, and wherein the paddles of the first set can be driven at a different speed to the paddles of the first set.

Preferably, the paddles of the first set have a peripheral velocity substantially the same as the oil in said upstream end.

Preferably, the flow control device is a body with a plurality of passages extending in said direction through which the oil is delivered to said upstream end.

Preferably, the passages are surrounded by the body.

Preferably, said flow control device is also configured to control the flow therethrough so that flow in said direction can vary, transversely across the flow.

Preferably, said device includes at least one plate having a plurality of passages, with the plate movably attached to the body to move the plate passages relative to the body passages to adjust said flow.

Preferably the device further includes at least one temperature sensor downstream of said device, a controller that receives a signal from each sensor, and a motor operatively associated with each plate to move the associated plate so that movement of the plate is at least partly determined by the temperature sensors.

Preferably, said plates includes a plurality of passages through which the oil flows to exit the body passages, with the plate passages moved relative to the body passage to adjust flow through the body passages.

Preferably, said device is configured so that the oil flows in a generally homogeneous and laminar manner at said upstream end.

Preferably, the oil at said upstream end has a width and a depth, with the oil at said upstream end, across the width and depth, flows in said predetermined direction in a generally linear manner.

BRIEF DESCRIPTION OF DRAWINGS

A preferred form of the present invention will now be described by way of example with reference to the accompanying drawings, wherein:

FIG. 2 is a schematic isometric view of a flow control device employed in the continuous flyer of FIG. 1;

FIG. 3 is a schematic exploded view of portion of the flow control device of FIG. 2;

FIG. 4 is a schematic front elevation of the flow control device of FIG. 2;

FIG. 5 is a schematic front elevation of portion of the flow control device as illustrated in FIG. 4;

FIG. 6 is a schematic front elevation of a further portion of the flow control device of FIG. 4;

FIG. 8 is a schematic enlarged portion of the flow control device as shown in FIG. 1.

DESCRIPTION OF EMBODIMENTS

Figure 1:
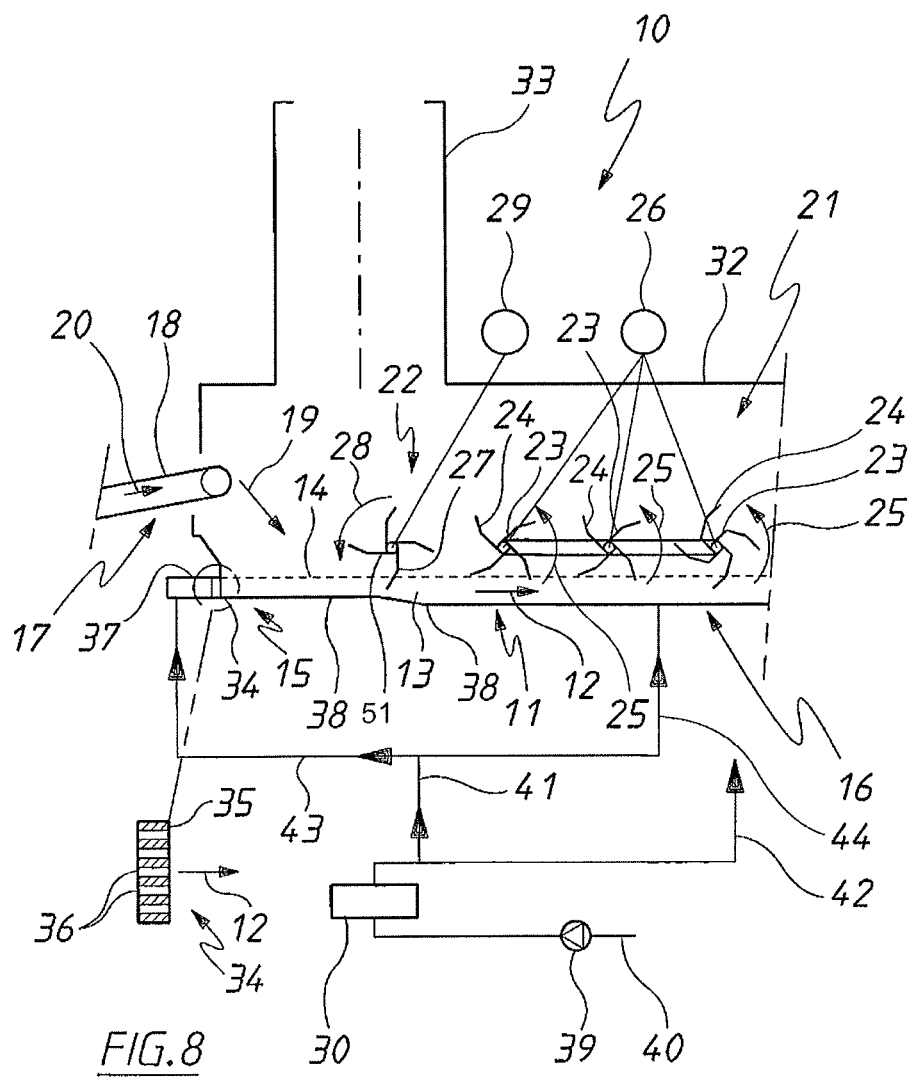
FIG. 1 is a schematic illustration of a continuous fryer.
Figure 7:
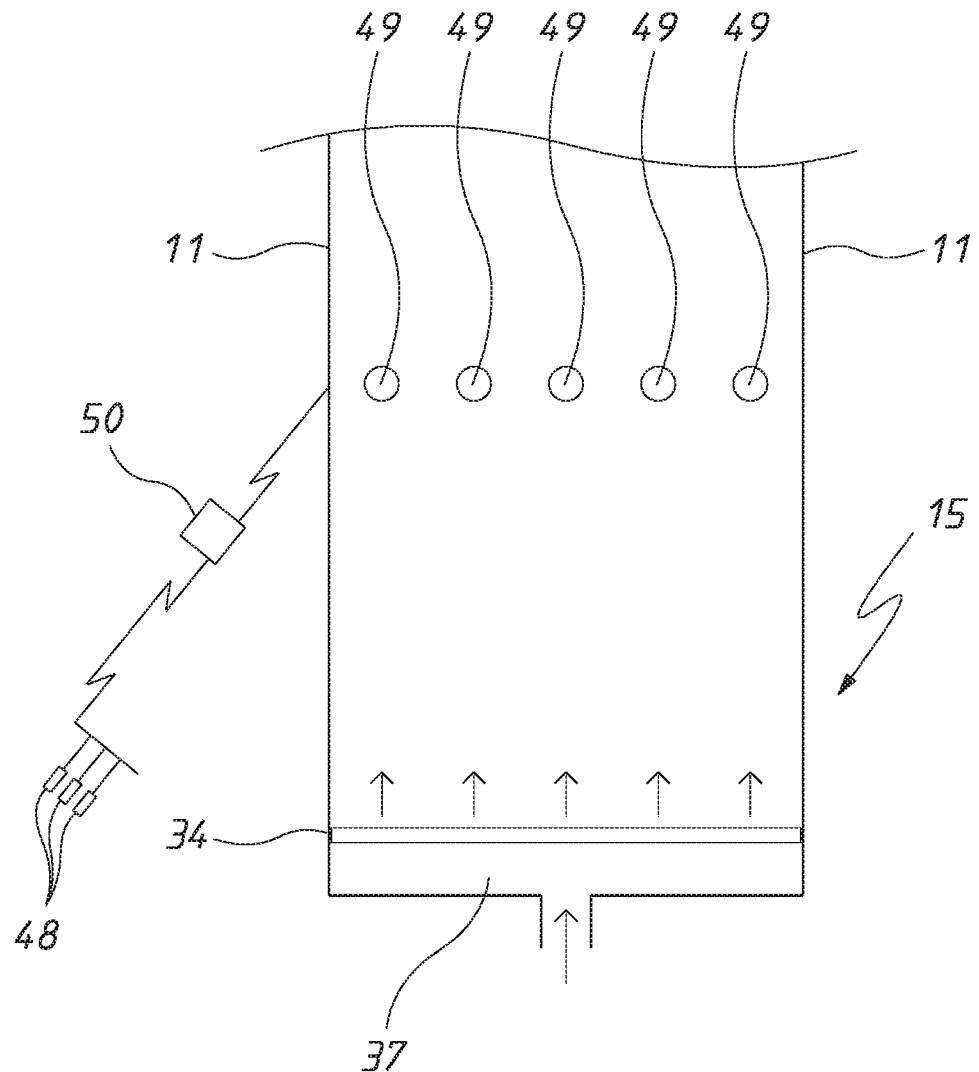
FIG. 7 is a schematic plan view of the fryer vessel of FIG. 1, with a flow control device.

In FIG. 1 of the accompanying drawing there is schematically depicted a continuous fryer 10. In this embodiment, the fryer 10 is an atmospheric fryer. However in an alternative embodiment the fryer may be a vacuum fryer as described in the abovementioned International Patent Application.

The fryer 10 includes a vessel (kettle) 11 that is longitudinally elongated in the direction 12.

The vessel 11 receives oil 13 that has an upper surface 14. The oil 13 is moved in the vessel 11 in the direction 12 from an upstream end 15 to a downstream end 16.

A conveyor 17, having an upper conveyor surface 18 moves the product 19 (such as uncooked potato slices) in the direction 20 so that the product 19 is delivered to the vessel 11 adjacent the upstream end 15.

The fryer 10 also includes a plurality of paddle assemblies 21, and a further paddle assembly 22. Each of the paddle assemblies 21 includes a shaft 23 from which there is generally radially extending a plurality of plates (paddles) 24.

Each of the shafts 23 is driven in the angular direction 25 by a motor and transmission assembly 26 so that the plates 24, when in the oil 13, move essentially in the direction 12 to aid in moving product in the direction 12 in a generally uniform manner. Preferably the assembly 26 operates the shafts 23 so that they have the same angular velocity. The shafts 23 extend generally transverse of the direction 12.

The paddle assembly 22 includes a shaft 51 from which there radially extend a plurality of plates (paddles) 27. The shaft 51 is driven in the angular direction 28 so that the plates 27 when in the oil 13, moves in the direction 12, again to aid in moving product in the direction 12. The shaft 51 is driven by a separate motor and transmission assembly 29 that can provide the shaft 51 with a different angular velocity relates to the shafts 23. Accordingly, the plates 27 may have a greater velocity, when in the oil 13, than the velocity of the plates 24. The velocity of the plates 24 is determined by the product dwell time.

The fryer 10 also includes a heater (heat exchanger) 30 that heats the oil and returns the oil to the upstream end 15 as well as the downstream end 16.

A pump 39, via line 40, receives oil from a downstream portion of the vessel 11 and delivers the oil to the heater 30. From there, lines 41 and 42 deliver oil to the vessel 11. In particular, the line 41 delivers oil to a line 43 extending to the upstream end 15, and a line 44 to extend to the downstream end 16.

The line 40 may include filters, and a means for adding oil to the fryer 10.

Above the vessel 11 is hood 32 with a stack 33 that removes vapour produced by the fryer 10.

Located adjacent the upstream end 15 is a flow control device 34, the device 34 may be a collimator. The flow control device 34 aids in controlling flow of oil in the direction 12 so that the oil flow, at least in the upstream end, is generally homogeneous throughout its depth and width, and is generally laminar.

Preferably the flow control device 34 is a plate or body 35 that is provided with a plurality of passages 36 that extend longitudinally in the direction 12 and through which the oil flows in the direction 12 to be delivered to the upstream end 15. The passages may be slots or surrounded by the body 35.

Preferably oil is delivered to a generally closed chamber 37 so that the flow control device 34 closes the chamber 37. The oil is delivered to the chamber 37 under pressure and flows through the passages 36 to be delivered to the upstream end 35.

Preferably adjacent the upper end 15 there is a flume provided by the vessel floor 38 that slopes downwardly in the direction 12 beneath the shaft 51.

In the embodiments of FIGS. 2 to 6, the flow control device 34 includes the body 35 with passages 36, however there is slidably mounted on the body 35 one or more plates 45. The plates 45 are slidably mounted on the body 35 for linear movement relative thereto in the direction 46. The direction 46 is generally perpendicular to the flow direction 12.

Each of the plates 45 is provided with a plurality of passages 47 that can be moved from a position aligned with the passages of 36, to a position at which they are partly aligned, or not aligned. Accordingly, the plates 45 can be moved to restrict flow through the passages 36.

Preferably each of the plates 45 is provided with motor (linear actuator) 48 that are operable to each move their associated plate 45 in the direction 46.

In FIG. 5. the passages 47 are illustrated as aligned with the passages 36. In FIG. 6, the passages 47 are slightly misaligned with the passage 36 so as to restrict flow.

Preferably, there is located downstream of device 34, a plurality of temperature sensors 49, located in the vessel 11 and submerged in the oil 13. Preferably the temperature sensors 49 are located adjacent or at the upstream end 15, but downstream of the device 34. The sensor 49 are connected to a controller 50 so that the controller 50 receives signals from the sensors 49, the signals being indicative of the temperature of the oil adjacent the particular sensor 49. The controller 50 is operatively associated with each of the motors 48, so that the controller 50 can adjust the positions of the plates 45, to thereby adjust the temperature transversely across the vessel 11, by controlling the flow rate through each plate 45, and therefore the associated passages 36. Accordingly the sensors 49 aid in determining the position of the plates 45.

The above described preferred embodiments have a number of advantages including reducing turbulence at the upstream end 5 which results in a more uniform product, increasing oil speed in the end 15, and enables control of the frying process to inhibit the production of acrylamide and over fried products. By operation of the motor and transmission assemblies 26 and 29 product dwell time is controlled so as to inhibit the build-up of product, thereby contributing to product consistency. A further advantage of controlling the oil speed is that smaller portions of the product are inhibited from building up. Small particles do not build up at the bottom of the vessel 11. This improves oil quality and increases production.

A still further advantage of the above described preferred embodiments is that product does not tend to cluster, again contributing to consistency of product quality, as the fryer 10 operates in the manner of a single layer fryer at the upstream area of the fryer 10 following the assembly 22.

The delivery rate of product 19 can be maintained at a generally consistent rate as there is little build-up of product in the vessel 11. As the delivery rate of production is substantially consistent, fluctuation in temperatures and dwell times are reduced, increasing product quality. That is dwell time deviation is reduced.

The invention claimed is:

1. A continuous fryer including:
   a vessel having a cavity to receive a heated cooking oil;
   a pump to circulate the oil so that the oil flows through the cavity in a predetermined direction from an upstream end to a downstream end of the cavity so that product to be fried delivered to the cavity moves in said predetermined direction; and a flow control device, through which the oil flows to be delivered to said upstream end, wherein the flow control device comprises a body with a plurality of body passages extending in said direction through which the oil is delivered to said upstream end, and at least two flow control plates each having a plurality of passages, wherein the at least two flow control plates are each individually movably attached to the body to move the plurality of passages of each flow control plate relative to the body passages between being aligned, partially aligned, and not aligned in order to individually adjust a plate flow rate through each of the at least two flow control plates in order to control an upstream end flow rate and cause the oil to flow in a generally homogeneous and laminar manner at said upstream end.

2. The continuous fryer of claim 1, wherein the upstream end is provided with a flume.

3. The continuous fryer of claim 1, wherein the fryer includes a product moving device including a plurality of spaced paddle plates that engage the oil and product moving with the paddle plates, so that the paddle plates are moved in said direction to aid in moving the product in said direction.

4. The continuous fryer of claim 3, wherein the paddle plates include a first set of paddle plates, with the paddle plates of the first set being located at spaced intervals along the vessel in said direction, and a second set of paddle plates upstream relative to the oil flow from the first set of paddle plates, and a drive assembly operable to drive the second set of paddle plates at a different speed to the first set of paddle plates.

5. The continuous fryer of claim 4, wherein the paddle plates are part of a paddle system including a plurality of shafts from which there extends a plurality of the paddle plates, with the paddle plates being driven at an angular velocity, and wherein the paddle plates of the first set can be driven at a different angular velocity to the paddle plates of the second set of paddle plates.

6. The continuous fryer of claim 4, wherein the oil has a velocity in said predetermined direction, and the paddle plates of the first set have a peripheral velocity substantially the same as the oil velocity in said upstream end.

7. The continuous fryer of claim 1, wherein the body passages are surrounded by the body.

8. The continuous fryer of claim 1, further including at least one temperature sensor downstream of said device, a controller that receives a signal from each sensor, and a motor operatively associated with each flow control plate to move the associated flow control plate so that movement of the flow control plate is at least partly determined by the temperature sensors.

9. The continuous fryer of claim 2, wherein the fryer includes a product moving device including a plurality of spaced paddle plates that engages the oil, with the paddle plates moved in said direction to aid in moving the product in said direction.

10. The continuous fryer of claim 9, wherein the oil has a velocity in said predetermined direction, and the paddle plates include a first set of paddle plates, with the paddle plates of the first set being located at spaced intervals along the vessel in said direction, and a second set of paddle plates upstream relative to the oil flow from the first set of paddle plates, and a drive assembly operable to drive the second set of paddle plates at a different speed to the first set of paddle plates, with the paddle plates being part of a paddle system including a plurality of shafts from which there extends a plurality of the paddle plates, with the paddle plates being driven at an angular velocity, and wherein the paddle plates of the first set of paddle plates can be driven at a different speed to the paddle plates of the second set of paddle plates, the paddle plates of the first set of paddle plates have a peripheral velocity substantially the same as the oil velocity in said upstream end.

11. The continuous fryer of claim 10, wherein said device includes at least one temperature sensor downstream of said device, a controller that receives a signal from each sensor, and a motor operatively associated with each control plate to move the associated control plate so that movement of the control plate is at least partly determined by the temperature sensors.

* * * * *